(12) United States Patent
Ferrari

(10) Patent No.: US 8,491,239 B2
(45) Date of Patent: Jul. 23, 2013

(54) LOAD RESTRAINT ASSEMBLY

(75) Inventor: Peter Warren Ferrari, Aspendale (AU)

(73) Assignee: Ferrari Investments Pty Ltd, Melbourne, Victoria (AU)

( * ) Notice: Subject to any disclaimer, the term of this patent is extended or adjusted under 35 U.S.C. 154(b) by 166 days.

(21) Appl. No.: 12/677,651

(22) PCT Filed: Mar. 13, 2009

(86) PCT No.: PCT/AU2009/000304
§ 371 (c)(1),
(2), (4) Date: May 24, 2010

(87) PCT Pub. No.: WO2009/111841
PCT Pub. Date: Sep. 17, 2009

(65) Prior Publication Data
US 2011/0274511 A1 Nov. 10, 2011

(30) Foreign Application Priority Data
Mar. 13, 2008 (AU) .................. 2008201175

(51) Int. Cl.
*B60P 7/08* (2006.01)
(52) U.S. Cl.
USPC ............ 410/49; 410/30; 410/47; 410/91; 410/94
(58) Field of Classification Search
USPC 410/47, 49, 50, 30, 42, 94, 91, 121; 206/389, 206/446; 105/362; 188/32; 248/351
See application file for complete search history.

(56) References Cited

U.S. PATENT DOCUMENTS

| 3,299,989 A | * | 1/1967 | Santosuosso ............... 410/42 |
| 4,219,229 A | | 8/1980 | Ciocan |
| 4,955,771 A | | 9/1990 | Bott |
| 5,425,608 A | | 6/1995 | Reitnouer |
| 5,836,605 A | | 11/1998 | Bowling |
| 5,927,915 A | * | 7/1999 | Grove, Sr. ............... 410/49 |
| 6,863,481 B2 | | 3/2005 | Pingel |

FOREIGN PATENT DOCUMENTS

| EP | 1 090 824 B1 | 4/2001 |
| GB | 1 529 290 | 10/1978 |

OTHER PUBLICATIONS

International Search Report: PCT/AU2009/000304.

* cited by examiner

*Primary Examiner* — Stephen Gordon
(74) *Attorney, Agent, or Firm* — Ladas & Parry LLP

(57) ABSTRACT

An assembly for locating and/or restraining a load carried on a tray of a truck or other vehicle. The assembly includes at least one line of openings such as keyholes in the tray at spaced intervals along at least a part of the length of a tray. The assembly also includes at least one chock for locating and/or restraining a load against forward or rearward movement on the tray, with the chock having a locking member that is adapted to be received in the openings so that the chock can be supported and retained in a selected position on the tray. The assembly also includes at least one bearer for locating and supporting a load, such as long products, on the tray.

12 Claims, 3 Drawing Sheets

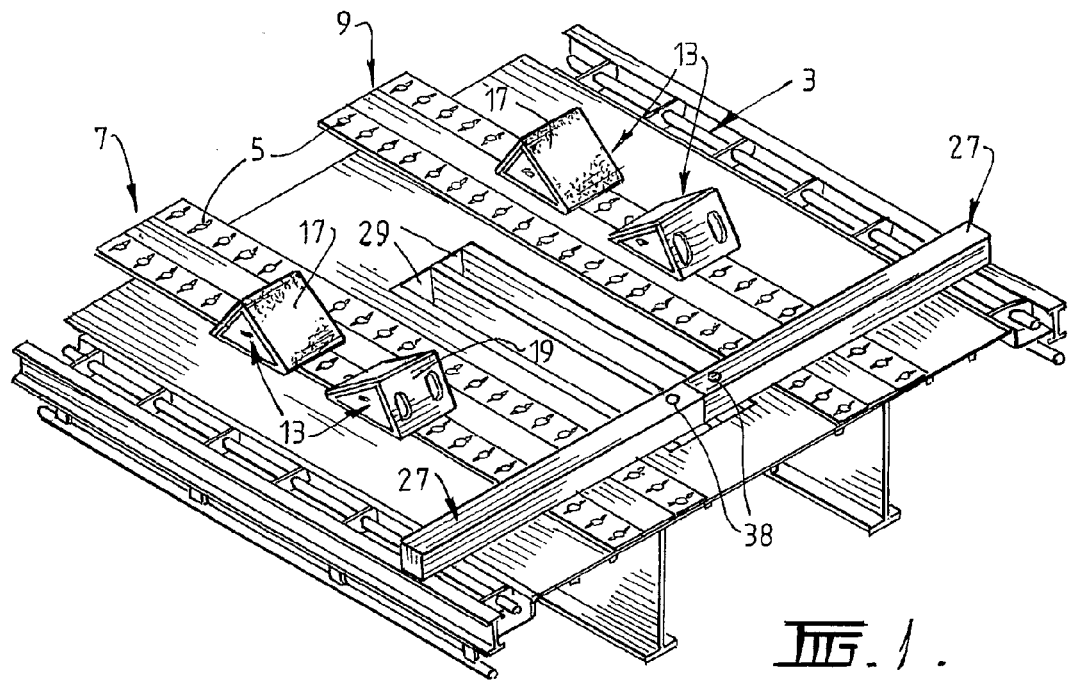
FIG_1.
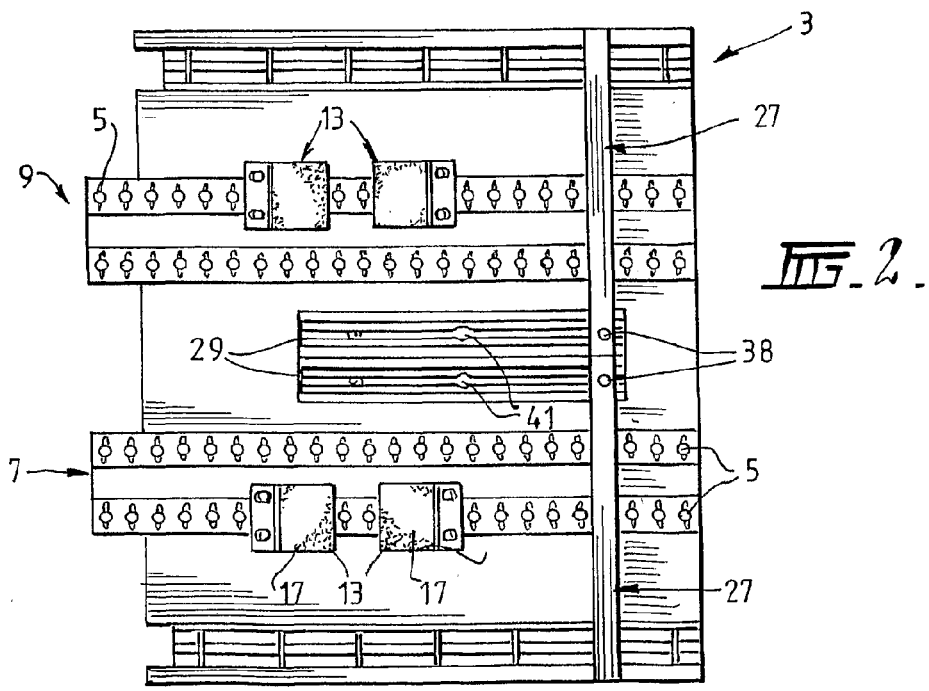
FIG_2.

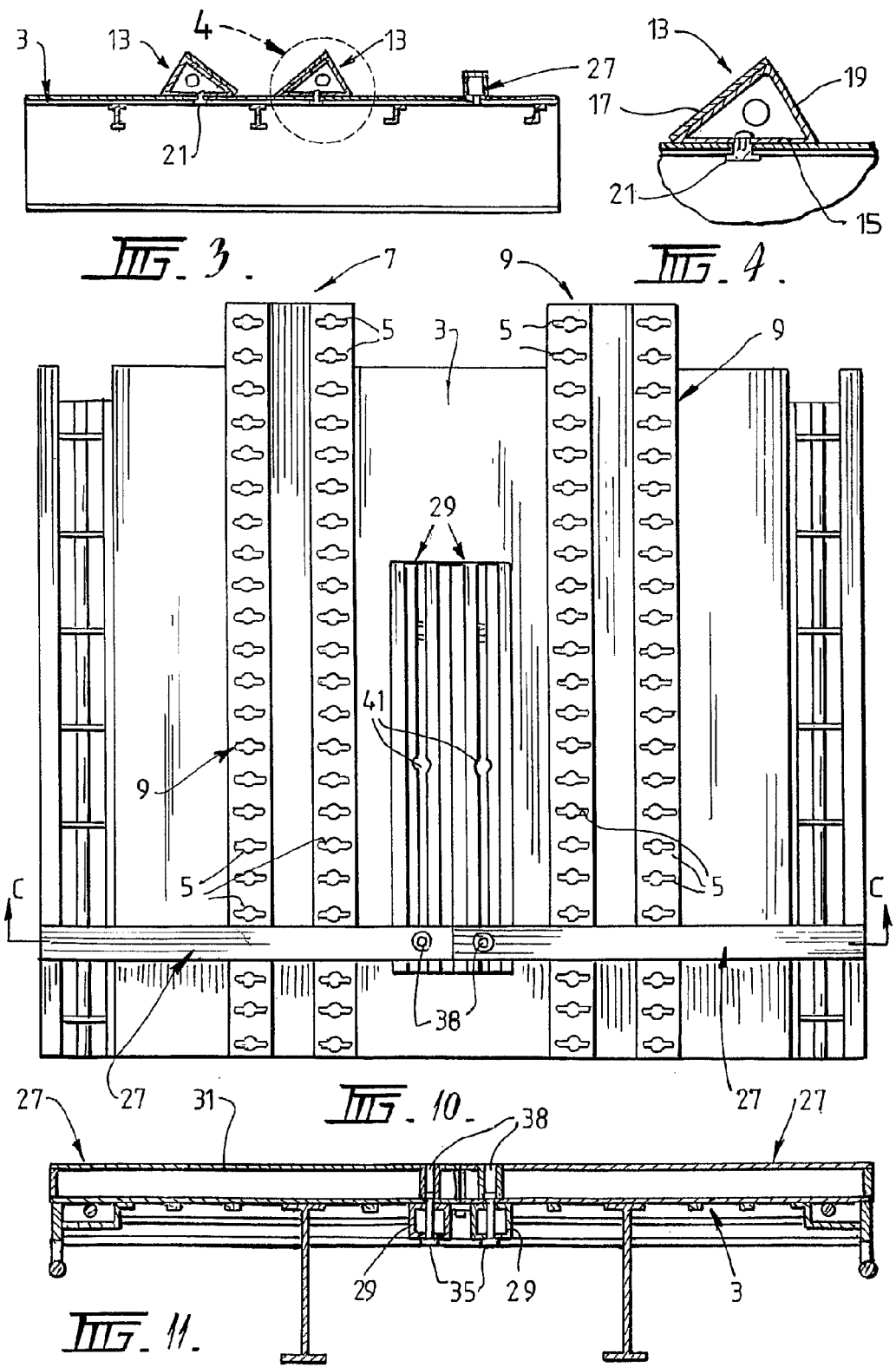

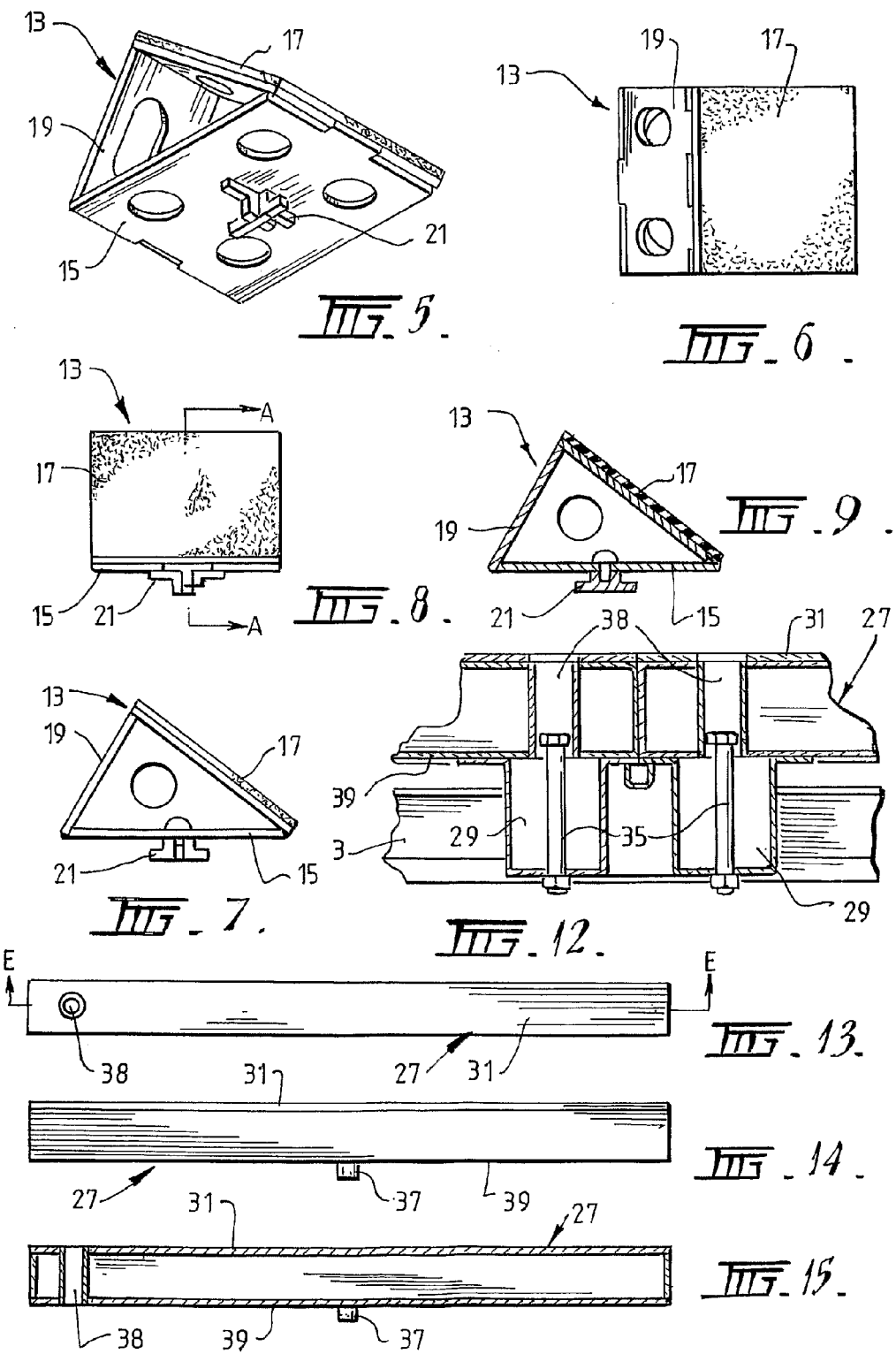

LOAD RESTRAINT ASSEMBLY

BACKGROUND OF THE INVENTION

The present invention relates to an assembly for locating and/or restraining loads carried on trays of trucks or other vehicles.

The present invention relates particularly, although by no means exclusively, to an assembly for locating and/or restraining loads in the form of coils of metal strip, such as steel strip.

Metal coils are typically very heavy, ranging from two to eighteen tonnes but most commonly between four and twelve tonnes, and difficult to handle. An important consideration for transporting metal coils is to locate and then restrain the coils securely on a truck tray. Metal coils are usually transported on their sides, i.e. on the outer circumference of the coils, to facilitate handling the coils via forklifts or other lifting devices onto and off truck trays. This is an inherently unstable orientation for metal coils, and given the weight of coils, is a potentially very unsafe way of transporting coils. Hence, it is necessary to locate and then securely restrain metal coils to truck trays. Typically, this is achieved by using blocks of timber contained within coil racks not attached to the tray to act as forward and rearward chocks and chains that are passed over the coils and secured to truck trays. However, the use of timber chocks and coil racks is unsatisfactory because of the heavy weight of the timber and the racks and the manhandling required to locate the chocks properly in the first place and then removing and stowing the chocks after a truck reaches a destination and offloads the coils.

An alternative to the method above, other than the present invention, is a device known as a Robo-rack™ which is used, one per coil, to secure product on a tray. Each Robo-rack device weighs in the vicinity of 250 kgs unladen and must be lifted on and off the tray with a fork lift, crane or similar mechanical lifting device prior to and after use. The Robo-rack device renders the tray unusable on a return journey due to its weight and the space it occupies on the tray.

The present invention provides an assembly that is particularly well-suited for locating and/or restraining metal coils and other loads on truck trays.

According to the present invention there is provided an assembly for locating and/or restraining a load carried on a tray of a truck or other vehicle that comprises:

(a) at least one line of openings, for example in the form of keyholes, in the tray at spaced intervals along at least a part of the length of a truck tray; and (b) at least one chock for locating and/or restraining a load against forward or rearward movement on the tray, with the chock having a member that is adapted to be received in the openings so that the chock can be located in a selected position on the tray.

The combination of the members (which may be formed as locking members) and the openings is a convenient and effective means of securely locating a chock on a tray. More particularly, the arrangement takes advantage of the inherent strength and rigidity of the tray structure to locate, and preferably securely retain, the chock in a selected position. The use of a line of spaced-apart openings provides an opportunity for considerable flexibility to position the chock on the tray. Moreover, the arrangement makes it possible to use chocks that are relatively lightweight compared to blocks of timber. This is an important issue from the health and safety viewpoint. Such chocks are considerably easier to lift and locate on a tray and to store when not being used. Moreover, such chocks make it possible to reduce the time currently required to locate and/or restrain a load on a tray.

There may be a constant spacing between the openings in the line. Typically, the spacing is in a range of 50-150 cm, measured as a centre-centre distance between adjacent openings in the line.

The line of openings may extend substantially along the length of the tray. Equally, the line of openings may extend a part of the length of the tray only.

The openings may be any suitable type of opening. By way of example, the openings may be keyholes.

The member may be a locking member to retain the chock in the opening.

The keyholes and the locking member may be a turn-key arrangement whereby the locking member extends outwardly from a base of the chock and engages a selected keyhole when the chock is positioned by an operator so that the locking member extends into the keyhole and the base is on the tray and the chock is then rotated 90° about an axis perpendicular to the tray to position the chock in the right orientation relative to the tray and to lock the locking member in the keyhole, with the tray supporting the chock in the selected position on the tray.

The chock may be a relatively compact and lightweight unit compared to blocks of timber and coil racks conventionally used as chocks.

More particularly, the chock may be generally triangular in side view and comprise a base for contacting the tray and two inclined walls extending from opposite ends of the base and connected together at upper ends and forming an apex of the chock.

Typically, the chock is formed from sections of plate steel that are welded together to form a triangular shape.

Typically, the chock comprises cut-outs that form a hand grip for ease of lifting the chock. The hand-grips also minimise the weight of the chocks.

Typically, the tray includes a recess that defines a storage position for the chocks.

The angle of inclination of one of the walls of the chock relative to the base may be selected so that the wall is suitably inclined to act as a contact surface for a load in the form of a metal coil.

There may be at least one pair of parallel lines of the openings, with each line being positioned symmetrically on opposite sides of a centre-line of the tray.

There may be two or more pairs of lines of the openings.

The assembly may also comprise at least one bearer that is coupled to the tray and can be moved from a storage position to an operative position in which the bearer extends at least partly across the tray and can act as a support for a load on the tray.

Typically, the storage position of the bearer is in a recess in the tray

The recess may be a channel extending lengthwise of the tray.

The assembly may comprise a pin or other pivot connection means for coupling the bearer to the tray so that the bearer can be swung between the storage position and the operative position.

The bearer may have a locating member extending from an underside of the bearer that is positioned to extend into an opening such as a keyhole in the tray when the bearer is in the operative position, and the locating member and the pivot connection means being spaced apart on the bearer and adapted to retain the bearer in the operative position.

There may be two bearers, each bearer being positioned on opposite sides of the centreline of the tray and forming a coaxial unit when in respective operative positions.

Typically, the assembly comprises a plurality of the bearers or pairs of bearers at spaced intervals along the length of the tray. The bearers are particularly suitable for supporting long products, such as bundles of steel reinforcing bars and plate steel and steel channels and steel pipes, above the tray so that fork lifts and other mechanical lifting devices can gain access to the products to load the products onto and to off-load the products from the tray.

According to the present invention there is provided a vehicle such as a truck that comprises a tray and at least one line of openings, such as keyholes, in the tray at spaced intervals along at least a part of the length of a truck tray for receiving and supporting chocks for locating and/or restraining a load on the tray.

The vehicle may also comprise at least one bearer that is coupled to the tray and can be moved from a storage position to an operative position, with the operative position being a position in which the bearer extends at least partly across the tray and can support a load.

The tray may comprise a recess in an upper surface of the tray that defines the storage position for the bearer.

According to the present invention there is provided an assembly for locating and/or supporting a load carried on a tray of a truck or other vehicle that comprises at least one bearer that is coupled to the tray and can be moved from a storage position to an operative position in which the bearer extends at least partly across the tray and can act as a support for a load on the tray.

Typically, the storage position of the bearer is in a recess in the tray

The recess may be a channel extending lengthwise of the tray.

The assembly may comprise a pin or other pivot connection means for coupling the bearer to the tray so that the bearer can be swung between the storage position and the operative position.

The bearer may have a locating member extending from an underside of the bearer that is positioned to extend into an opening in the tray when the bearer is in the operative position, and the locating member and the pivot connection means being spaced apart on the bearer and adapted to retain the bearer in the operative position.

There may be two bearers, each bearer being positioned on opposite sides of the centreline of the tray and forming a coaxial unit when in respective operative positions.

Typically, the assembly comprises a plurality of the bearers or pairs of bearers at spaced intervals along the length of the tray.

According to the present invention there is provided a vehicle such as a truck that comprises a tray and the above-described assembly for locating and/or restraining a load on the tray.

BREIF DESCRIPTION OF THE DRAWING FIGURES

The present invention is described further with reference to the accompanying drawings, of which:

FIG. 1 is a perspective view of a section of a truck tray that illustrates one embodiment of an assembly for restraining a load on the tray in accordance with the present invention;

FIG. 2 is a top plan view of the tray shown in FIG. 1;

FIG. 3 is a section along the line A-A in FIG. 2;

FIG. 4 is a an enlargement of the circled region in FIG. 3;

FIG. 5 is a perspective view of one of the chocks shown in FIGS. 1-4;

FIG. 6 is a top plan view of the chock;

FIG. 7 is a side view of the chock;

FIG. 8 is a front view of the chock;

FIG. 9 is a section along the line A-A in FIG. 8;

FIG. 10 is a top plan view of the tray shown in FIG. 1 but in a different orientation;

FIG. 11 is a section along the line C-C in FIG. 10;

FIG. 12 is an enlargement of the circled region in FIG. 11;

FIG. 13 is a top plan view of one of the bearers shown in the Figures;

FIG. 14 is a side view of the bearer; and

FIG. 15 is a section along the line E-E in FIG. 13.

DETAILED DESCRIPTION OF SEVERAL EMBODIMENTS

The following description is in the context of a tray of a truck for carrying a load in the form of coils of steel strip, with the coils being positioned on their sides, i.e. on the outer circumference of the coils, on the tray, so that the rotary centrelines of the coils are perpendicular to the length direction of the tray.

The following description is also in the context of a tray of a truck for also carrying long products, such as bundles of steel reinforcing and plate steel and steel channel sections and steel pipes on the tray.

The tray 3 shown in FIG. 1 has four parallel lines of openings in the form of keyholes 5 cut in the tray. The keyholes 5 have a constant spacing in each line. Typically, the centre-centre spacing of the keyholes is 100 cm. The selection of the spacing is purely a function of the load to be carried on the tray. The spacing does not have to be constant.

The lines of the keyholes 5 are arranged in two pairs of lines. The lines in each pair are positioned symmetrically on opposite sides of a longitudinal centreline of the tray 3. One pair of lines is identified by the numeral 7 and the other pair of lines is identified by the numeral 9. The positions of the lines are selected to allow the tray 3 to carry a wide range of different sizes of steel coils.

The lines of the keyholes 5 form part of an assembly for restraining metal coils on the tray 3.

The assembly also comprises a plurality of chocks 13 for locating coils (not shown) on the tray 3 and then restraining (alternatively describes as "supporting") the coils against forward and rearward movement on the tray 3. FIG. 1 shows four chocks 5 positioned on the tray 3 in positions suitable for supporting a coil of steel strip in position on the tray 3.

As can best be seen in FIG. 5, each chock is formed from sections of steel plate that are welded together into a triangular arrangement and is compact and lightweight in construction when compared to conventional timber beams. The chocks 13 are formed with cut-out sections that act as hand-grips and minimise the weight of the chocks. Each chock 13 has a base 15 and two walls 17, 19 extending upwardly and inwardly from opposite ends of the base and connected together at an apex of the chock. The wall 17 has a rubberised surface that makes the wall suitable to act as a contact surface for a coil. The angle of inclination of the contact wall 17 relative to the base 15 is selected so that, in use, the contact wall 17 makes effective contact with a coil. Each chock 13 also comprises a locking member 21 for locking the chock 13 to the tray 3. The locking member 21 extends outwardly from the base 15. The keyholes 5 and the locking member 21 define a turn-key arrangement whereby the locking member 21 can be positioned to engage a selected keyhole 5 by an operator positioning the chock 13 so that the locking member 21 extends into the keyhole 5 and the base 17 is on the tray 3 and then rotating the chock 13 through 90° to position the chock 13 in the right orientation relative to the tray 3 (as shown in FIG. 5) and to lock the locking member 21 in the keyhole 5 and thereby lock the chock 13 in position on the tray. This arrangement takes advantage of the strength and rigidity of the tray 3, whereby the tray 3 is a sturdy mounting for the chock 13 and facilitates locating and supporting the chock 13 in a selected location on the tray 3.

It can be appreciated from FIG. 1 that two pairs of chocks 13, each pair comprising forwardly and rearwardly facing chocks 13, can be quickly and securely located on the tray 3 to then receive and support a steel coil. After the coil has been located on the tray 3, one or more chains can be wrapped over and/or through the coil and tied to the tray to complete the process of securely restraining the coil onto the tray 3.

FIG. 1 also shows a pair of bearers 27 mounted to the tray 3. The pair of bearers is one of a number of pairs of bearers positioned at spaced intervals along the length of the tray 3. The bearers 27 are shown in an operative position in FIG. 1 extending co-axially across the width of the tray 3. In this operative position, the bearers 27 can act as load carrying bearers for long products such as bundles of reinforcing bars, steel plates, steel channel sections, and steel pipes. The bearers 27 are mounted to the tray 3 for pivoting movement between the operative position shown in FIG. 1 and a storage position in a pair of channels 29 recessed into the upper surface of the tray 3 and extending in the length direction of the tray 3. When positioned in the storage position, the upper surfaces 31 of the bearers 27 are flush with the tray surface and therefore form part of the tray surface. This feature minimises the risk of people working on the tray tripping when the bearers 27 are in the storage position.

It is evident from the Figures that the bearers 27 are coupled to the tray via pins 35 that are connected to the bases of the channels 29 in the tray 3 and to mounting sleeves 37 in the bearers 27. This arrangement makes it possible for the bearers 27 to be swung between the operative and storage positions.

Each bearer 27 comprises a locating pin 27 extending from a lower surface 39 of the beam. The pin 27 is positioned to serve two functions. One function is to locate the bearers 27 in the storage position in the channels 29. In this regard, the channels 29 are formed with openings 41 that receive the pins 37 and facilitate holding the bearers 27 in position in the channels. The other function is to locate and hold the bearers 27 in the operative position shown in FIG. 1. In this regard, the assembly is constructed so that the location of the pins 37 coincides with the central opening of keyholes 5 so that the openings receive the pins 37 when the bearers 27 are in the operative position.

The above described arrangement is an effective and safe option for locating and restraining loads, such as, but not limited to, coils of steel strip, that are heavy and otherwise difficult to restrain securely and safely to the tray of a truck or other vehicle.

The above described arrangement is also an effective and safe option for locating and restraining (in the sense of supporting) loads such as long products such as bundles of reinforcing bar and steel plate and steel channel sections and steel pipes that are heavy and otherwise difficult to locate and restrain securely and safely to the tray of a truck or other vehicle.

Many modifications may be made to the embodiment of the present invention described above in relation to the drawings without departing from the spirit and scope of the invention.

By way of example, whilst the above description focuses on loads in the form of metal coils and long products such as bundles of reinforcing bar and steel plate and steel channel sections and steel pipes, the present invention is not so limited and extends to locating and restraining other forms of loads.

In addition, the present invention is not limited to a tray that can carry both metal coils and long products such as bundles of reinforcing bar and steel plate and steel channel sections and steel pipes and extends to trays that are arranged to carry one only of these types of loads.

Furthermore, whilst the above description of the present invention is in the context of the tray of a truck, the present invention is not so limited and extends to other types of vehicles, such as rolling stock for rail transport, that have trays for carrying loads that have to be securely restrained on the trays.

Furthermore, whilst the above description of the present invention describes keyholes 5 in the tray 3, the present invention is not so limited and extends to the use of any suitable openings in trays 3 that can receive chocks 13.

Furthermore, whilst the above description of the present invention describes that the chocks 13 have locking members 21 to retain the chock in the opening, the present invention is not so limited and extends to any suitable members that can locate the chocks 13 in the keyholes 5 or other types of openings in the tray 3.

The invention claimed is:

1. An assembly for locating and/or restraining a load carried on a tray of a truck or other vehicle that comprises:
    (a) at least one line of openings in the tray at spaced intervals along at least a part of a length of the tray, wherein the openings are in the form of keyholes; and
    (b) at least one chock for locating and/or restraining a load against forward or rearward movement on the tray, wherein the chock is generally triangular in side view and comprises a base for contacting the tray and two inclined walls extending from opposite ends of the base and connected together at upper ends and forming an apex of the chock, and with the chock having a locking member that extends outwardly from the base and is adapted to be received in the openings so that the chock can be located in a selected position on the tray; and wherein the keyholes and the locking member are a turn-key arrangement whereby the locking member engages a selected keyhole of the keyholes when the chock is positioned by an operator so that the locking member extends into the selected keyhole and the base is on the tray and the chock is then rotated 90° about an axis perpendicular to the tray to position the chock in the right orientation relative to the tray and to lock the locking member in the selected keyhole, with the tray supporting the chock in the selected position on the tray.

2. The assembly defined in claim 1 wherein the line of the openings extends substantially along the length of the tray or a part of the length of the tray only.

3. The assembly defined in claim 1 wherein the chock is a relatively compact and lightweight unit compared to blocks of timber and coil racks conventionally used as chocks.

4. The assembly defined in claim 1 wherein the angle of inclination of one of the walls relative to the base is selected so that the wall is suitably inclined to act as a contact surface for a load in the form of a metal coil.

5. The assembly defined in claim 1 wherein there are two lines of the openings, with the lines being parallel, and with each line being positioned symmetrically on opposite sides of a centre-line of the tray.

6. The assembly defined in claim 1 comprising at least one bearer that can be coupled to the tray and can be moved from a storage position to an operative position in which the bearer extends at least partly across the tray and can act as a support for a load on the tray.

7. The assembly defined in claim 6 wherein the storage position is in a recess in the tray.

8. The assembly defined in claim 6 comprising a pin or other pivot connection means coupling the bearer to the tray so that the bearer can be swung between the storage position and the operative position.

9. The load restraint assembly defined in claim 8 wherein the bearer has a locating member extending from an underside of the bearer that is positioned to extend into an opening in the tray when the bearer is in the operative position, the locating member and the pivot connection means being spaced apart on the bearer and being adapted to retain the bearer in the operative position.

10. The assembly defined in claim 6 wherein there are two bearers, each bearer being positioned on opposite sides of a centerline of the tray and forming a coaxial unit when in respective operative positions.

11. A vehicle that comprises the tray and the assembly for locating and/or restraining the load on the tray defined in claim 1.

12. The vehicle defined in claim 11 wherein the load is a coil of steel strip and the assembly supports the coil with an axis of the coil perpendicular to a direction of travel of the vehicle.

* * * * *